(12) United States Patent
Merz et al.

(10) Patent No.: US 11,855,513 B2
(45) Date of Patent: Dec. 26, 2023

(54) ELECTRIC DRIVE HAVING AN ELECTRICAL CONNECTION INCLUDING A SLEEVE

(71) Applicant: Robert Bosch GmbH, Stuttgart (DE)

(72) Inventors: Harald Merz, Sinzheim (DE); Harold Bitzer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 17/042,321

(22) PCT Filed: Mar. 28, 2019

(86) PCT No.: PCT/EP2019/057878
§ 371 (c)(1),
(2) Date: Sep. 28, 2020

(87) PCT Pub. No.: WO2019/185807
PCT Pub. Date: Oct. 3, 2019

(65) Prior Publication Data
US 2021/0083549 A1 Mar. 18, 2021

(30) Foreign Application Priority Data

Mar. 28, 2018 (DE) .................... 10 2018 204 790.1

(51) Int. Cl.
*H02K 5/10* (2006.01)
*H02K 5/22* (2006.01)

(52) U.S. Cl.
CPC ............... *H02K 5/225* (2013.01); *H02K 5/10* (2013.01)

(58) Field of Classification Search
CPC . H02K 5/10; H02K 5/22; H02K 5/225; H01R 4/023; H01R 4/024; H01R 4/206
See application file for complete search history.

(56) References Cited

U.S. PATENT DOCUMENTS

| 6,628,024 B1 | 9/2003 | Mirmobin |
| 7,249,968 B1 | 7/2007 | Fish et al. |

(Continued)

FOREIGN PATENT DOCUMENTS

| CN | 105556756 A | 5/2016 |
| CN | 107592951 A | 1/2018 |

(Continued)

OTHER PUBLICATIONS

Hentschel, Machine Translation of DE102010044241, Mar. 2012 (Year: 2012).*

(Continued)

*Primary Examiner* — Eric Johnson
(74) *Attorney, Agent, or Firm* — Michael Best & Friedrich LLP

(57) ABSTRACT

The invention relates to an electric drive (10), in particular an electric motor of an engine-cooling fan or of an ABS/ESP of a motor vehicle, comprising an electric connector (22) and a housing (12), in the interior (14) of which a drive assembly (16) is arranged. The electric connector (22) has at least one electric line (41) contacting the drive assembly (16), an opening (20) is formed on the housing (12) for guiding through the electric line (41), and a seal (24) is arranged in the region of the housing opening (20). The electric line (41) has a first portion (50) and a second portion (52), the first portion (50) having a conductor (44) mid a sheath (48) encasing the conductor (44), and the second portion (52) being formed as an exposed conductor (44), the electric connector (22) having a sleeve-like element (42) in which the second portion (52) is arranged at least in part. According to the invention, the sleeve-like element (42) is connected in a fluid-tight manner to the second portion (52) and the seal (24) bears at least partially against the sleeve-like element (42), and the electric conductor (22) in the (Continued)

direction of its extent (54) is fluid-tight with respect to the housing interior (14) in the region of the sleeve-like element (42).

10 Claims, 4 Drawing Sheets

(56) References Cited

U.S. PATENT DOCUMENTS

| | | | | |
|---|---|---|---|---|
| 2002/0050385 | A1* | 5/2002 | Murakami | H01R 4/206 174/74 R |
| 2002/0134565 | A1* | 9/2002 | Hashizawa | H01R 13/6592 174/370 |
| 2013/0088106 | A1* | 4/2013 | Bitzer | H02K 5/10 310/71 |
| 2013/0230997 | A1 | 9/2013 | Asak et al. | |
| 2017/0069975 | A1* | 3/2017 | Baldauf | H01R 43/0207 |

FOREIGN PATENT DOCUMENTS

| | | | |
|---|---|---|---|
| DE | 102004032572 A1 | 1/2006 | |
| DE | 102010024206 A1 | 1/2011 | |
| DE | 102010044241 A1 * | 3/2012 | ............ H01R 4/024 |
| DE | 102013216465 | 2/2015 | |
| EP | 2852033 A1 | 3/2015 | |
| EP | 3190670 | 7/2017 | |
| JP | 5668237 | 6/1981 | |
| KR | 101082892 B1 * | 11/2011 | |
| WO | 2007024285 A2 | 3/2007 | |
| WO | 2011154181 | 12/2011 | |
| WO | WO-2015018851 A1 * | 2/2015 | ............ H01R 4/187 |

OTHER PUBLICATIONS

Decker et al., machine translation of WO2015018851, Feb. 2015 (Year: 2015).*
Kim, machine translation of KR101082892, Nov. 2011 (Year: 2011).*
International Search Report for Application No. PCT/EP2019/057878 dated Jun. 3, 2019 (English Translation, 2 pages).

* cited by examiner

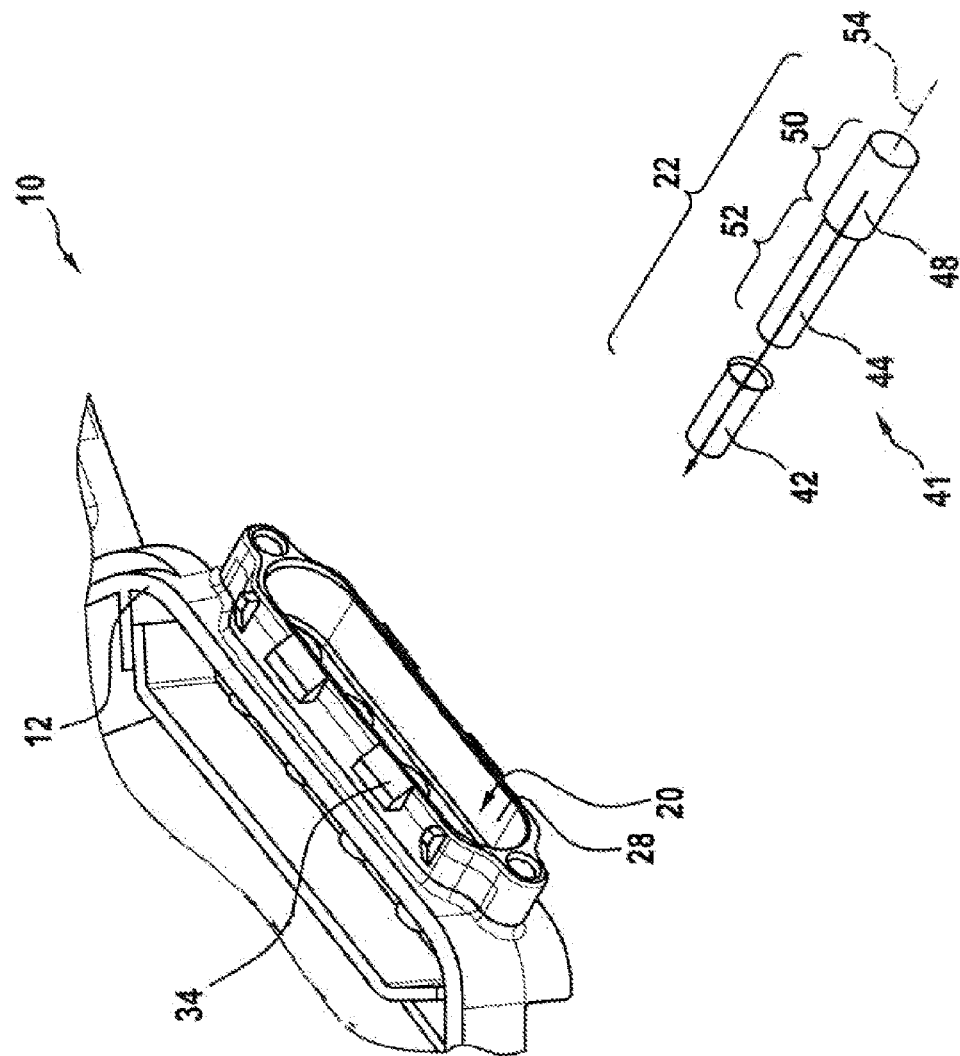

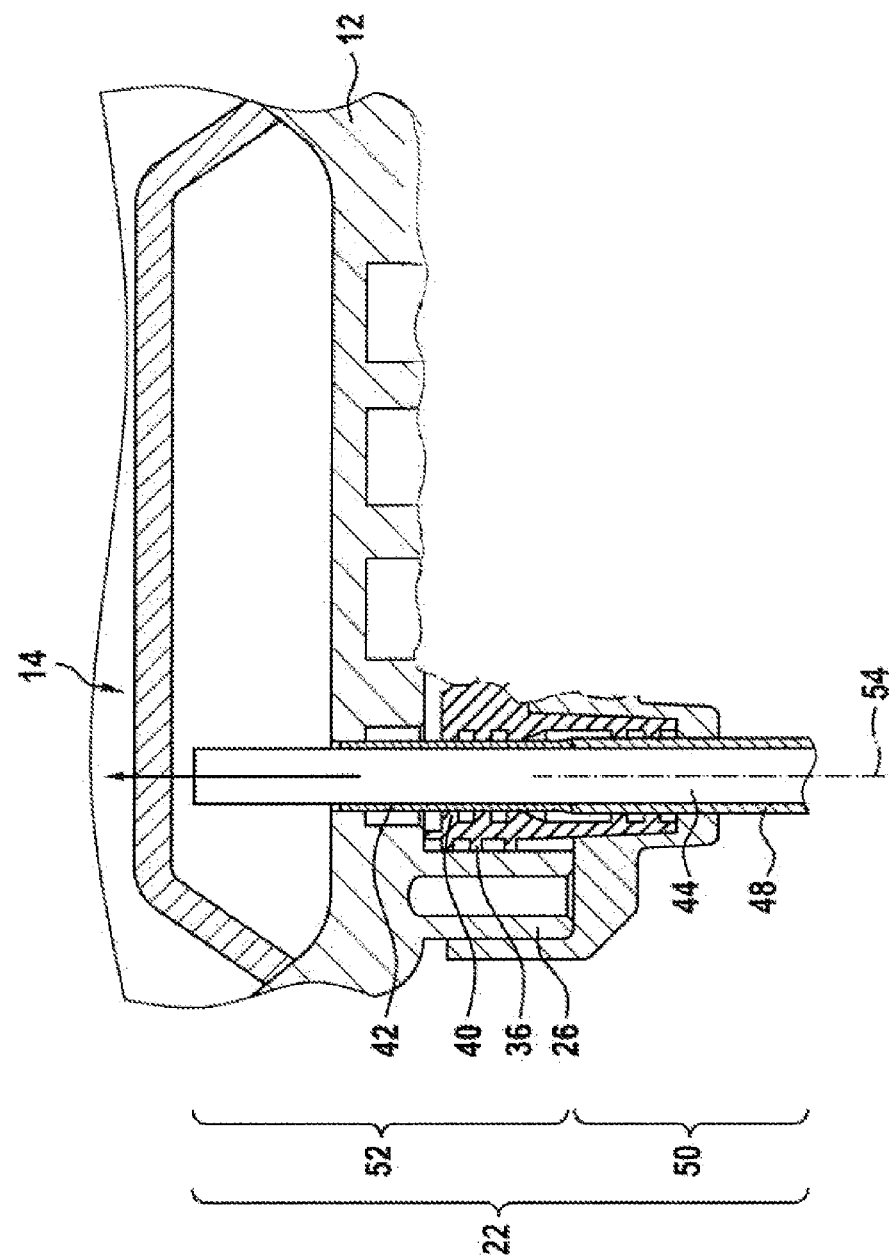

A-A

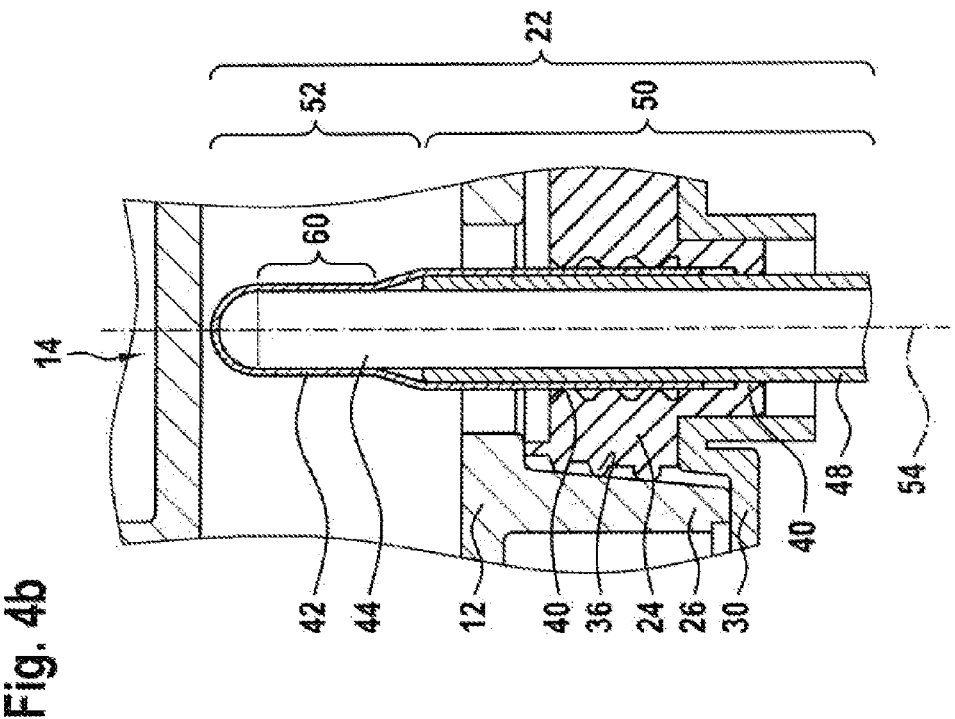
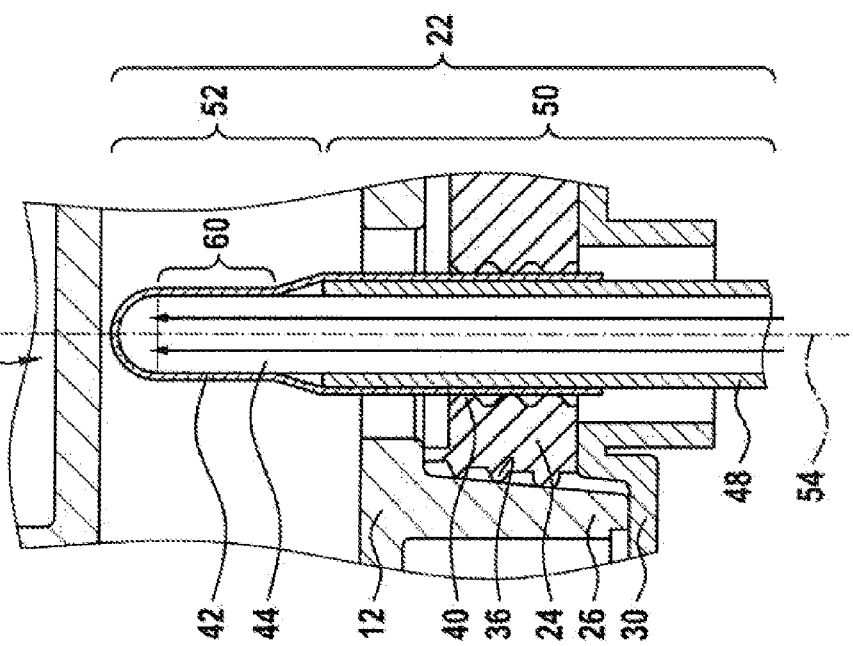

ELECTRIC DRIVE HAVING AN ELECTRICAL CONNECTION INCLUDING A SLEEVE

BACKGROUND OF THE INVENTION

The invention relates to an electric drive, in particular an electromotor of an engine cooling fan or an ABS/ESP system of a motor vehicle.

For the application of electromotors in the field of engine cooling fans and/or ABS/ESP systems of motor vehicles, it is necessary that the electromotors have a fluid-tight design, i.e. that electric control and supply lines must lead fluid-tightly into the housing of the electromotor.

It is known from the prior art that a seal is arranged between the housing opening and the electric line which leads through this opening, said seal bearing against the insulation of the electric conductor. However, in the sealing solutions known from the prior art, undesired penetration of moisture into the housing interior can occur via the capillaries arranged between the individual strands of an electric conductor.

SUMMARY OF THE INVENTION

The invention relates to an electric drive, in particular an electromotor of an engine cooling fan or an ABS/ESP system of a motor vehicle, with an electric connection and a housing, in the housing interior of which a drive device is arranged, and wherein the electric connection has at least one electric line contacting the drive device, and wherein a housing opening for the passage of the electric line is formed on the housing and a seal is arranged in the region of the housing opening, wherein the electric line has a first section and a second section, wherein the first section has a conductor and a sheath enclosing the conductor, and the second section takes the form of an exposed conductor, and wherein the electric connection has a sleeve-like element in which the second section is at least partially arranged. It is proposed that the sleeve-like element is connected to the second section in a fluid-tight fashion and the seal bears at least partially against the sleeve-like element and the electric connection is designed so that it is fluid-tight with respect to the housing interior in the region of the sleeve-like element in the direction of extent.

The electric drive according to the invention with the features of the independent claim has the advantage that it is possible to prevent liquid from being able to penetrate into the housing interior in the gaps between the individual strands of such a conductor owing to the capillary effect. By virtue of the improved sealing of the housing interior, the lifetime of the drive device can be increased because the electrical components in the housing interior react with faults, such as, for example, short circuits or corrosion, owing to the electrical conductivity of the liquids. Liquid or water can in particular enter the housing interior when the electric line is damaged, for example, by being bitten by rodents. In such a case, liquid can advantageously be prevented from penetrating into the housing interior owing to the fluid-tight design of the electric connection in the direction of extent. The arrangement according to the invention of the seal and sleeve-like element relative to each other moreover enables any liquid paths into the housing interior to be sealed in the region of the sleeve-like element such that the permanent sealing of the housing interior can be provided in a particularly space-saving fashion. The sleeve-like element can be fitted particularly simply by the sleeve-like element being pushed onto the electric line. Moreover, the sleeve-like element according to the invention can be produced cost-effectively according to an advantageous embodiment of the invention by means of deep-drawing a piece of sheet metal.

In a particularly space-saving and cost-effective embodiment of the invention, it is provided that the sleeve-like element takes the form of an element which is open on one side and the conductor has a plurality of strands, wherein the strands are designed so that they are fluid-tight with respect to one another in a longitudinal sealing section in the direction of extent.

Such a fluid-tight design of the strands with respect to one another in the longitudinal sealing section can, according to a particularly preferred embodiment of the invention, be provided by the strands and the sleeve-like element being designed so that they are fluid-tight and tin-plated by means of solder in the longitudinal sealing section. The free end of the electric line is preferably already pre-tin-plated. By tin-plating the conductor and the sleeve-like element, the tin runs into the gaps between the individual strands and into the region between the line and the sleeve and seals the electric connection in the direction of extent.

A particularly cost-effective embodiment of the invention provides that the sleeve-like element takes the form of a wire end ferrule and hence, in addition to sealing the electric connection in the direction of extent, can be used to protect the exposed conductor such that the latter can be connected to the drive device without damaging the individual strands. By using such a sleeve-like element, it is thus advantageously possible to dispense with the pre-tin-plating of the stripped end of the electric line because said end is protected in the sleeve-like element and the strands do not become unspliced.

A further advantageous embodiment of the invention provides that the sleeve-like element takes the form of an element which is closed on one side and is designed so that it is welded at least partially to the second section of the electric line. Owing to the closed sleeve, no liquid can no longer be transported into the housing interior via the capillaries between the strands in the direction of extent of the electric connection. Such a sleeve is advantageously formed from a metal such as, for example, copper, tin-plated copper, aluminum, or stainless steel. It can furthermore be provided that the sleeve is coated in the longitudinal sealing section in order to increase the corrosion resistance.

An advantageous embodiment of the invention provides that the seal takes the form of a mat seal. By means of such a mat seal or elastomer seal, a circumferential sealing effect with respect to the sleeve-like element and, alternatively or additionally, with respect to the sheath of the electric line can be particularly advantageously provided. It is, however, also conceivable that the seal takes the form of shrink-on tubing, elastomer tubing, or a sealing strip.

BRIEF DESCRIPTION OF THE DRAWINGS

Exemplary embodiments of the invention are shown in the drawings and explained in detail in the following description, in which:

FIG. 1 shows a detail of an electric drive according to the invention in an exploded view, FIG. 2 shows a view in section of an electric drive according to the invention according to a first embodiment, FIG. 4a shows a view in section of a detail of an electric drive with an electric connection according to a second embodiment, FIG. 4b shows a view in section of a detail of an electric drive with an electric connection according to a third embodiment.

DETAILED DESCRIPTION

Figure 3A:
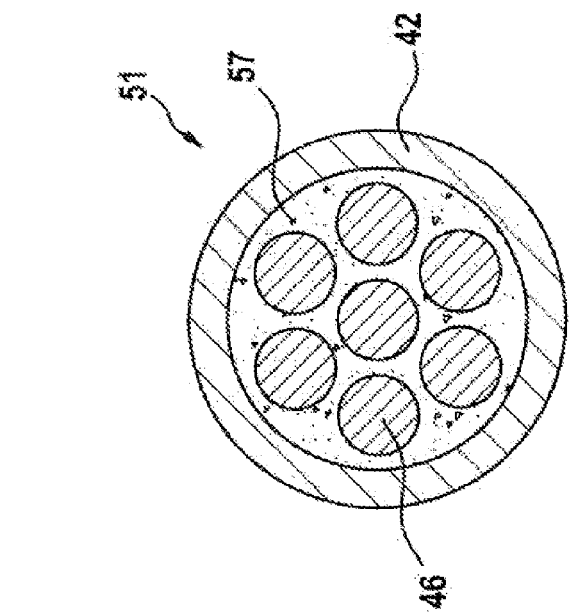
FIG. 3a shows the cross-section through an electric connection along the line of section AA in FIG. 3.

FIG. 1 shows a detail of a perspective view of an electric drive 10 according to a first embodiment. As can be seen in FIG. 1, the drive device 16 with the electronic control unit 18 is arranged in the housing interior 14 of the housing 12 of the electric drive 10. A housing opening 20, via which at least one electric connection 22 passes into the housing interior 14, is formed on the housing 12. The electric connections 22 can be connected to connection devices inside the housing 12, wherein the electric lines supply the electromotor 10 with electric power to generate torque and, alternatively or additionally, transmit control signals thereto or carry signals away therefrom.

As can be seen clearly in FIG. 1, a seal 24 is moreover provided in the region of the housing opening 20. According to an advantageous development of the invention, a projection 26 formed on the housing 12 is provided to receive the seal 24. According to an advantageous development of the invention, this projection 26 has an essentially cuboid contour with an inner receiving region 28 which extends longitudinally. The seal 24 is preferably arranged essentially at least partially inside the inner receiving region 28 formed by the projection 26. A plug element 30 is moreover provided for the purpose of fixing or fastening the electric connection 22 and as an alternative or in addition to the seal 24 on the housing 12.

The plug element 30 preferably has a shape that corresponds to the projection 26 and is pushed axially onto the projection 26 during assembly. It is hereby preferred that the plug element 30 is locked on the housing 12 or the projection 26. Such locking can be effected, for example, via latching devices 32 formed on the plug element 30 such as, for example, latching hooks which latch on the housing 12 onto suitable latching devices such as, for example, a latching projection 34. Locking by means of a locking spring or retaining spring is also possible. A locking spring is preferably formed in such a way that it retains the plug element axially on the housing 12 or projection 26 even when the electric drive 10 is stressed by vibrations.

According to an advantageous development of the invention, the seal 24 takes the form of a mat seal, preferably a radial seal. It is furthermore also conceivable that the mat seal 24 provides a combined radial and axial seal. As already explained at the beginning, according to the terminology used henceforth, a radial seal should be understood to be a radially loaded seal 24 which provides a sealing effect in the axial direction. The seal 24 is arranged in the inner receiving region 28 of the housing 12 and clamped between the housing 12 and the plug element 30. For greater visibility, only the lower segment of the seal 24 is illustrated in FIG. 1. The corresponding covering segment (not shown here) usually corresponds essentially to the segment shown in FIG. 1. Such a seal 24 is preferably formed as a single piece. The seal 24 has at least one outer radial sealing lip 36 in order to provide a sealing effect on the housing 12. In the assembled state, this radial sealing lip 36 is pressed against the inner receiving region 28 of the projection 26. The seal 24 preferably has a plurality of outer radial sealing lips 36 which are formed circumferentially on the outer surface of the mat seal.

As can be seen in FIG. 1, the electric line 22 passes from outside through the housing opening 20 into the housing interior 14. The electric connection 22 thus passes through a through opening 38 provided in the seal 24. The electric connection 22 is sealed in the through opening 38 via at least one inner radial sealing lip 40 formed in the through opening 38 on the seal 24. As shown, a plurality of circumferential inner radial sealing lips 40 can, for example, be provided which, in the assembled state, bear against an upper surface of the electric connection 22 in sealing fashion. The seal 24 surrounds the electric connection 22 circumferentially in sealing fashion and additionally provides a sealing effect between the housing 12, or the inner receiving region 28 of the projection 26, and the electric connection 22 in a fluid-tight fashion.

The electric connection 22 comprises an electric line and a sleeve-like element 42. The electric line 41 has a conductor 44 which is formed from an electrically conductive material such as, for example, copper or a copper alloy. According to an embodiment of the invention, the conductor 44 is formed from a plurality of individual strands 46 or individual wires. The conductor 44 of the electric line is, as can be clearly seen in FIG. 1, enclosed at least in some sections by a tubular sheath 48 which electrically insulates the conductor 44 on the outside. Such a sheath 48 can take the form of, for example, a PVC sheath or redox sheath. According to the invention, the electric line 41 has a first section 50 and a second section 52. The second section 52 is arranged according to the invention at the free end of the electric line 40 and takes the form of an exposed conductor, i.e. it is not enclosed by the sheath 48. The sheath 48 can, by way of example, have been removed in the second section 52 of the electric line 41. Alternatively, it is possible for the sheath 48 to have not been arranged in the second section 52 of the electric line 41 at any time during the production of the latter. Accordingly, the first section 51 has a conductor 44 and a sheath 48 enclosing the conductor 44. The two sections 50, 52 are preferably arranged adjacent to each other in the direction of extent 54 of the electric line 40.

According to the invention, as already mentioned, the electric connection 22 has a sleeve-like element 42 in addition to the electric line 41. As can be seen in FIG. 1, the sleeve-like element 42 according to an advantageous embodiment of the invention has an essentially hollow cylindrical form. FIG. 1 shows a first embodiment of the invention, according to which the sleeve-like element 42 takes the form of an element which is open on both sides. During the production of the electric drive 10, the sleeve-like element 42 is pushed onto the electric line 41 and connected in fluid-tight fashion to the second section 52 of the electric line 41. Liquid can in principle penetrate, in the region of the electric connection 22, between the seal 24 and the electric connection 22, between the sheath 48 and the conductor 44, and between the individual strands 46 of the conductor 44, into the housing interior 14. In order to prevent this, the second section 52 of the electric connection 22 is arranged at least partially in the sleeve-like element, the sleeve-like element 56 is connected in fluid-tight fashion to the second section 52, a seal section of the seal 24 bears at least partially on the sleeve-like element 56, and the electric line 41 is designed to be fluid-tight with respect to the housing interior 14 in the direction of extent 54. The sleeve-like element 42 is preferably constructed from a metal, particularly preferably from copper, tin-plated copper, aluminum, stainless steel, or a combination thereof.

FIG. 2 shows the detail illustrated in FIG. 1 of the electric drive 10 in the assembled state in a view in cross-section. The electric connection 22 is passed into the housing interior 14 through a housing opening 20 and is electrically contacted there with the drive device. A seal 24 is arranged in the region of the housing opening. According to the embodiment of the invention shown in FIG. 2, the seal 24 takes the form of a mat seal. As can be clearly seen in FIG. 2, the seal 24 bears with a first seal section in sealing fashion against the sleeve-like element 42 and with a second seal section against the insulating sheath 48 and in this way a particularly leakproof arrangement can be provided. For this purpose, the mat seal has a plurality of inner radial sealing lips 40 which bear against both the sleeve-like element 42 and against the sheath 48. According to the embodiment of the invention shown in FIG. 2, the sleeve-like element 42 takes the form of an element which is open on one side.

Figure 3:
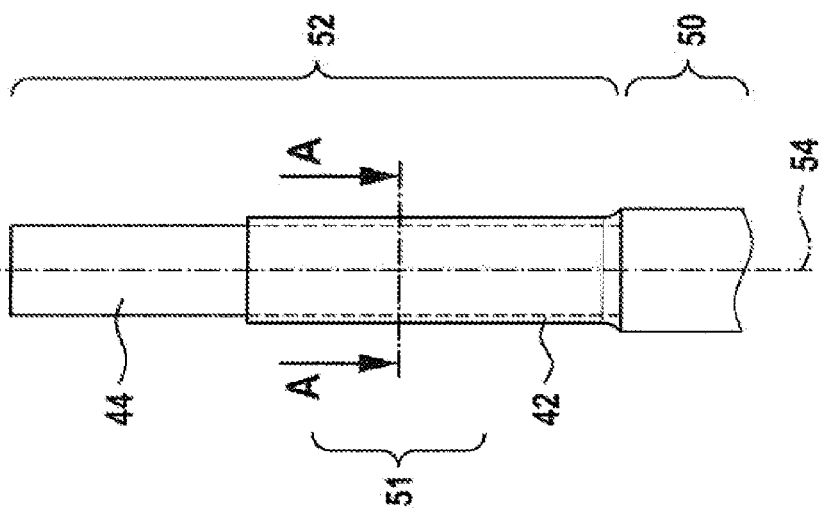
FIG. 3 shows an enlarged view of a first embodiment of an electric connection.

FIG. 3 shows an enlarged view of the electric connection 22 from FIG. 2. As can be seen clearly in FIG. 3, the sleeve-like element takes the form of a sleeve which is open on one side and is pushed onto the electric line. According to the embodiment shown in FIG. 3, the sleeve-like element is pushed as far as the front side of the sheath 48. The length of the sleeve-like element 42 is here dimensioned such that a section of the exposed conductor 44 remains above the sleeve-like element. According to an advantageous development of the invention, the sleeve-like element 42 is now jointly tin-plated with the conductor 44 in a longitudinal sealing section 51.

FIG. 3a shows a cross-section of an electric connection 22, in the longitudinal sealing section 51 of the sleeve-like element 56 along the line of section AA. As can be seen clearly in FIG. 3a, the gaps which take the form of capillaries between the individual strands 46 are filled with solder 57. In this way, a cross-section of the electric connection 22 which has essentially no cavities can be provided which is thus closed in fluid-tight fashion in the direction of extent 54. As can be seen in FIG. 3a, both the gaps between the individual strands 46 and also between the strands 46 and the sleeve-like element 42 are completely filled with solder 57. Such a tin-plated electric connection 22 particularly advantageously seals the housing interior 14 with respect to liquids which can be transported from outside in the longitudinal direction by the conductor 44 into the housing interior 14 by capillary effects.

FIG. 4a shows a further embodiment of the invention. As can be seen in FIG. 4a, the sleeve-like element 42 takes the form of an element which is closed on one side. According to an advantageous embodiment of the invention, the sleeve-like element 42 bears against the first section 51 and the second section 52 in the assembled state. For a fluid-tight connection between the conductor 44 and the sleeve-like element 42, the sleeve-like element 42 is welded to the conductor 44 in a welded section 60 of the electric connection 22. By virtue of the design of the sleeve-like element 42 such that it is closed on one side, the electric connection 22 is designed so that it is fluid-tight in the direction of extent 54 such that liquids 11 cannot penetrate into the housing interior 14 through the cavities between the strands 46. As can be seen clearly in FIG. 4, the seal 42 bears with the inner radial sealing lips 40 against the sleeve-like element 42 circumferentially in sealing fashion in the region of the first section 50. In this way, longitudinal watertight passage of the electric connection 22 into the housing 22 can be provided.

FIG. 4b shows the embodiment of the invention shown in FIG. 4a with the difference that the seal 24 has an additional inner radial sealing lip 40 which bears against the sheath 48 of the first section 50 circumferentially in sealing fashion such that the seal between the electric connection 22 and the housing 12 has an additional second sealing plane.

According to a further advantageous embodiment of the invention, it is also conceivable that the sleeve-like element 42 is crimped or compressed to the electric line 41 in a crimped region. The crimped region is preferably arranged in the region of the second section 52. By virtue of the crimping between the conductor 44 of the second section 52 and the sleeve-like element 42, a mechanical fluid-tight connection between the sleeve-like element 42 and the conductor 44 can advantageously be provided. According to an advantageous embodiment of the invention, the conductor 44 is compressed in the crimped region in such a way that the gaps between the individual strands 46 are closed. In this way, a conductor 44 with a fluid-tight design in the direction of extent 54 can be provided. According to a particularly advantageous embodiment, further crimped regions can be provided on the electric connection 22 in addition to the first crimped region.

What is claimed is:
1. An electric drive (10) comprising
an electric connection (22),
a housing (12) having a housing interior (14), and
a drive device (16) arranged in the housing interior,
wherein the electric connection (22) has at least one electric line (41) contacting the drive device (16), wherein a housing opening (20) for the passage of the electric line (41) is formed on the housing (12) and a seal (24) is arranged in a region of the housing opening (20), wherein the electric line (41) has a first section (50) and a second section (52), wherein the first section (50) has a conductor (44) and a sheath (48) enclosing the conductor (44), and the second section (52) forms an exposed conductor (44), and wherein the electric connection (22) has a sleeve-like element (42) in which the second section (52) is at least partially arranged, characterized in that the sleeve-like element (42) is connected to the second section (52) in a fluid-tight fashion and the seal (24) bears at least partially on the sleeve-like element (42) and the electric connection (22) is fluid-tight with respect to the housing interior (14) in a region of the sleeve-like element (42) in a direction of extent (54) of the sleeve-like element (42), wherein the sleeve-like element (42) is open on both sides such that the conductor (44) passes entirely through the sleeve-like element (42) and into the housing interior (14),
wherein the conductor (44) has a plurality of strands (46), and
wherein the strands (46) and the sleeve-like element (42) are configured in fluid-tight fashion and tin-plated by means of solder (57).
2. The electric drive (10) as claimed in claim 1, wherein the strands (46) are configured to be fluid-tight with respect to one another in a longitudinal sealing section (51) in the direction of extent (54).
3. The electric drive (10) as claimed in claim 1, characterized in that the sleeve-like element (42) is a wire end ferrule.
4. The electric drive (10) as claimed in claim 1, characterized in that the seal (24) is a mat seal.

5. The electric drive (10) as claimed in claim 1, characterized in that the sleeve-like element (42) is constructed from a metal.

6. The electric drive (10) as claimed in claim 1, characterized in that the sleeve-like element (42) is constructed from copper, tin-plated copper, aluminum, stainless steel, or a combination thereof.

7. The electric drive (10) as claimed in claim 1, characterized in that an exposed portion of the conductor (44) is within the housing interior (14).

8. The electric drive (10) as claimed in claim 1, characterized in that the sleeve-like element (42) and the sheath (48) both abut the seal (24).

9. The electric drive (10) as claimed in claim 1, characterized in that the sleeve-like element (42) is cylindrical.

10. The electric drive (10) as claimed in claim 1, characterized in that the conductor (44) extends into the housing interior (14) along the direction of extent (54) further than the sleeve-like element (42).

* * * * *